A. P. GRIFFIN.
CHAIN CONNECTION.
APPLICATION FILED APR. 7, 1921.
1,394,618.
Patented Oct. 25, 1921.
2 SHEETS—SHEET 1.
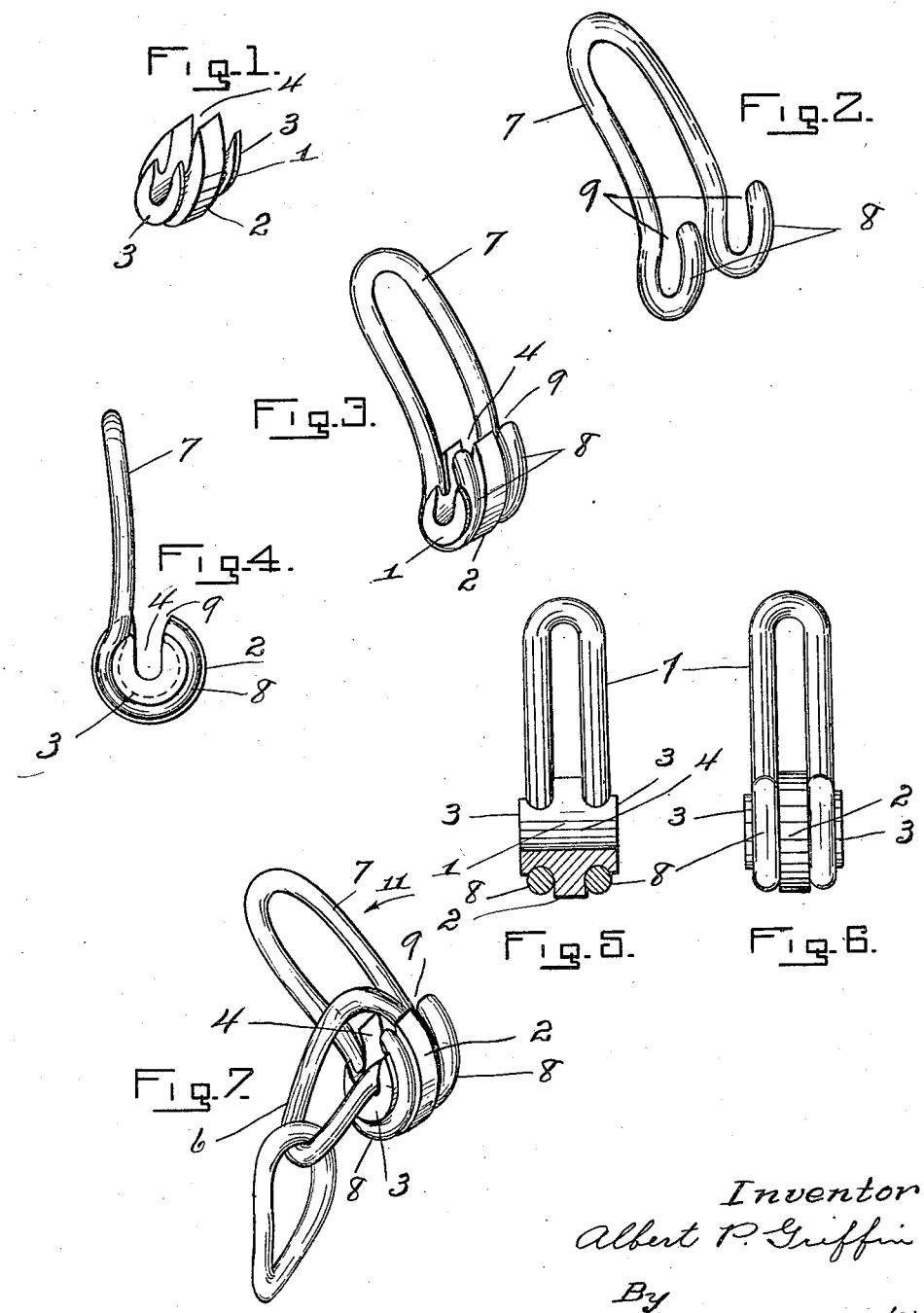
Inventor
Albert P. Griffin
By
Frank C. Curtis
Attorney

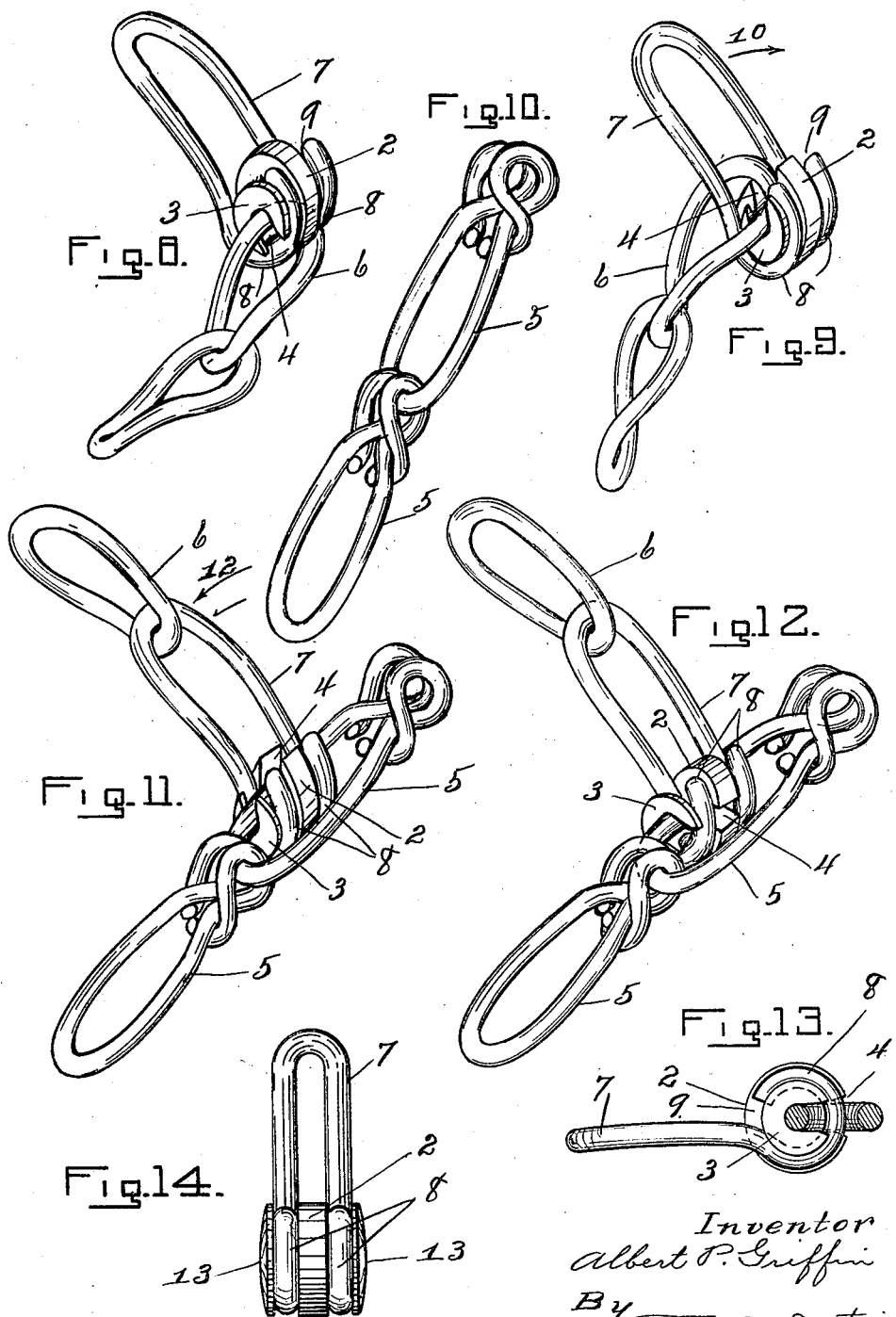

UNITED STATES PATENT OFFICE.

ALBERT P. GRIFFIN, OF TROY, NEW YORK.

CHAIN CONNECTION.

1,394,618.  Specification of Letters Patent.  Patented Oct. 25, 1921.

Application filed April 7, 1921. Serial No. 459,382.

*To all whom it may concern:*

Be it known that I, ALBERT P. GRIFFIN, a citizen of the United States, residing at Troy, in the county of Rensselaer and State of New York, have invented new and useful Improvements in Chain Connections, of which the following is a specification.

Reference may be had to the accompanying drawings, and the reference characters marked thereon, which form a part of this specification. Similar characters refer to similar parts in the several figures therein.

The invention is adapted for connecting together chain links of various kinds, but it is particularly adapted for connecting the cross-chains with the longitudinal chains of a non-skid chain device.

The principal object of the invention is to provide a secure, yet readily separable, connection between a cross-chain and a longitudinal chain.

Other objects will appear in connection with the following description.

Figure 1 of the drawings is a view in perspective of the core-piece of my improved chain connection.

Fig. 2 is a view in perspective of a U-shaped link adapted to be rotatively mounted upon the core-piece.

Fig. 3 is a view in perspective showing the U-shaped link rotatively mounted upon the core-piece.

Fig. 4 is a view in side elevation of the same.

Fig. 5 is a cross-section of the same taken on the broken line 5—5 in Fig. 4.

Fig. 6 is a front view of the same.

Fig. 7 is a view in perspective illustrating the manner in which a cross-link is placed in the U-shaped link in position for a hook-terminal of the U-shaped link to be threaded therethrough.

Fig. 8 is a similar view showing one of the hook-terminals of the U-shaped link partly threaded through the closed link of the cross-chain.

Fig. 9 is a similar view showing the closed link threaded upon the shank of the U-shaped link.

Fig. 10 is a view in perspective of a section of a longitudinal chain.

Fig. 11 is a view in perspective illustrating the manner in which a link of the longitudinal chain is seated in the slot in the core-piece and in the hook-terminals of the U-shaped link preparatory to threading the ends of the U-shaped link through the longitudinal link.

Fig. 12 is a similar view showing the hook-terminals of the U-shaped link threaded through the link of the longitudinal chain.

Fig. 13 is a view similar to Fig. 4, showing in cross-section a link of the longitudinal chain connected with a cross-chain.

Fig. 14 is a view similar to Fig. 6, illustrating a modified form of core-piece.

Referring to the drawings wherein the invention is shown in preferred form, 1 is a core-piece having a circumferential flange, 2, and on opposite sides thereof a pair of trunnions, 3—3, and formed with an open slot, 4, along one side of said flange and trunnions, which slot is of dimensions to freely receive either a link, 5, of a longitudinal chain or a closed link, 6, of a cross-chain.

A U-shaped link, 7, of a cross-chain is adapted to be rotatively mounted upon the core-piece by means of hook-shaped terminals, 8, on the U-shaped link, which terminals partly encircle the respective trunnions with the circumferential flange, 2, of the core-piece between said terminals.

The hook-shaped terminals, 8, are formed with openings, 9, of a width to freely receive either the link, 5, or the link, 6, but these terminals are made to encircle the respective trunnions more than one hundred eighty degrees whereby they are securely though rotatively mounted upon the trunnions.

I have shown in the drawings only a short section of the longitudinal chain and only a short section of a cross-chain.

The cross-chains are made of a number of closed links, 6, terminating at each end in a U-shaped link, 7, whereby the cross-chain is connected with a longitudinal chain.

By means of my improved connection the closed link portion of a cross-chain can readily be removed and replaced, replacement of the terminal U-shaped links being rarely required as they are not exposed to the same wearing action as the closed links of the cross-chain.

In removing a closed link, 6, from the connection, the U-shaped link is moved into such a rotative position with respect to the core-piece that the openings, 9, in its hook-terminals register with the slot, 4, in the core-piece, which position is shown in Figs. 3 and 4.

The closed link, 6, which engages the U-shaped link is then moved along one of the members of the U-shaped link through the opening in the hook terminal of that member, and into the slot in the core-piece as shown in Fig. 9.

The U-shaped link is then rotatively moved in the direction of the arrow, 10, relatively to the core-piece and link, 6, causing said hook-terminal to be unthreaded from the closed link, 6, thereby releasing the closed link, the releasing position being shown in Fig. 7, and an intermediate position being shown in Fig. 8.

In applying a closed link, 6, to the U-shaped link the operation is reversed, the closed link being inserted through the opening of a hook-terminal of the U-shaped link into the slot, 4, in the core-piece in the position shown in Fig. 7, and the U-shaped link is then rotatively moved in the direction of the arrow, 11, relatively to the core-piece and link, 6, causing the end of the hook-terminal to be threaded through the closed link until the parts reach the position shown in Fig. 9, in which the closed link is threaded upon the body of the U-shaped link, Fig. 8 showing the intermediate position as before.

In attaching the cross-chain to the longitudinal chain, the U-shaped link and core-piece are brought to the position shown in Figs. 3 and 4, and a link, 5, of the longitudinal chain is inserted through the openings, 9, in the hook-terminals of the U-shaped link into the slot, 4, in the core-piece as shown in Fig. 11.

By a relative rotative movement between the U-shaped link and the core-piece the direction of which is indicated by the arrow, 12, with respect to the U-shaped link, the hook-terminals are threaded through the longitudinal chain link, 5, until the parts assume the relative position shown in Figs. 12 and 13, in which position the cross-chain is secured to the longitudinal chain. A reversal of the operation just described serves to release the cross-chain from the longitudinal chain.

In Fig. 14, I have shown the trunnions, 3, formed with enlarged heads or flanges, 13, whereby the hook-terminals of the U-shaped link are confined, and spreading of the link is prevented.

What I claim as new and desire to secure by Letters Patent is—

1. A chain-connection comprising in combination a core-piece having a pair of trunnions on opposite sides of a circumferential flange, and provided with an open link-receiving slot along one side of said flange and trunnions; and a U-shaped link having terminals rotatively engaging the respective trunnions and severally provided with link-receiving openings adapted to register with said open slot in one rotative position of said U-shaped link relatively to said core-piece.

2. The combination with a cross-chain having a closed link, and a U-shaped link having open hook-terminals whereby it can be threaded through said closed link; of a core-piece having a circumferential flange extending between, and a pair of trunnions on opposite sides of said flange rotatively engaged by, said hook-terminals, said core-piece being provided with an open link-receiving slot along one side of said flange and trunnions adapted to register with the openings in said hook-terminals in one rotative position of said core-piece relatively to said U-shaped link.

3. The combination with a longitudinal chain; and a cross-chain having a closed link, and a U-shaped link having open hook-terminals whereby it can be threaded through said closed link, and through a link of said longitudinal chain; of a core-piece having a circumferential flange extending between, and a pair of trunnions on opposite sides of said flange rotatively engaged by, said hook-terminals, said core-piece being provided with an open slot along one side of said flange and trunnions adapted to register with the openings in said hook-terminals in one rotative position of said core-piece relatively to said U-shaped link, in which position either said closed link of the cross-chain, or said link of the longitudinal chain can be inserted through the openings in said hook-shaped terminals into said slot in the core-piece.

4. A chain-connection comprising in combination a core-piece having a pair of trunnions on opposite sides of a circumferential flange, and provided with an open link-receiving slot along one side of said flange and trunnions; and a U-shaped link having terminals rotatively engaging the respective trunnions and severally provided with link-receiving openings adapted to register with said open slot in one rotative position of said U-shaped link relatively to said core-piece, said core-piece having hook-terminal-confining flanges on the outer ends of said trunnions.

In testimony whereof, I have hereunto set my hand this 4th day of April, 1921.

ALBERT P. GRIFFIN.